Nov. 16, 1965   E. R. HARDWICK   3,218,375
MOLDING OF FOAM PLASTIC ARTICLES
Filed Dec. 21, 1962
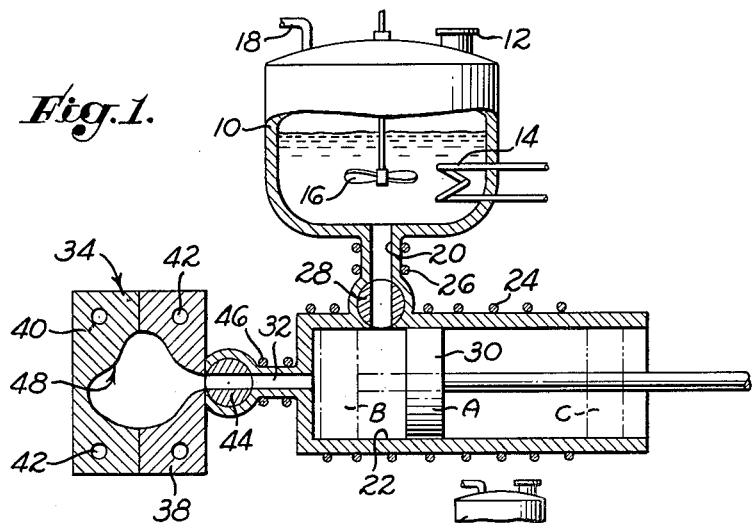
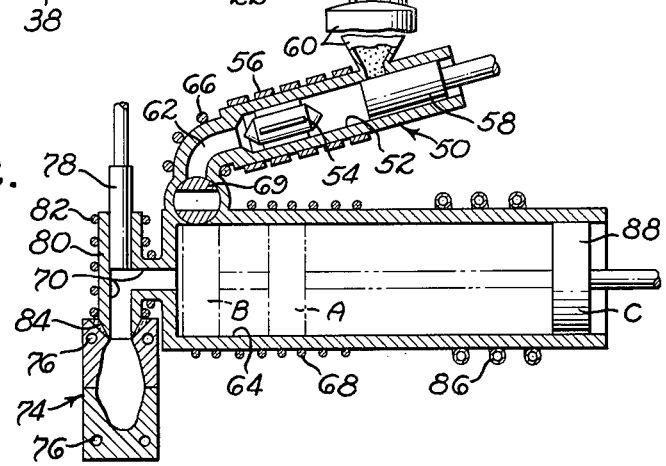
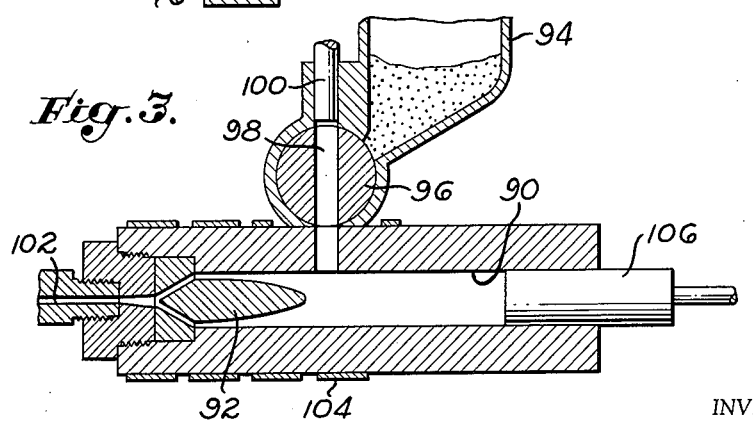
INVENTOR.
EUGENE RUSSELL HARDWICK
BY HIS ATTORNEYS.
HARRIS, KIECH, RUSSELL & KERN

United States Patent Office 3,218,375
Patented Nov. 16, 1965

3,218,375
MOLDING OF FOAM PLASTIC ARTICLES
Eugene Russell Hardwick, 2039 Linnington Ave.,
Los Angeles, Calif.
Filed Dec. 21, 1962, Ser. No. 246,440
15 Claims. (Cl. 264—45)

This invention is concerned with the molding of foam plastic objects.

Plastic articles having a cellular or foam structure are conventionally produced by placing partially expanded polystyrene or other plastic beads in a mold cavity. With the application of heat, the beads expand to fill the cavity, providing the desired cellular structure. The surfaces of the molded articles are usually of the same general texture as the interior of the articles, and present an open, generally porous appearance. This conventional process for the manufacture of foam plastic articles is relatively slow, being considerably less rapid than is the production of plastic articles by injection molding. Heretofore it has not been considered feasible to use injection molding techniques for the manufacture of foam plastic objects.

It has now been found possible to utilize injection molding for the manufacture of foam plastic objects. In a preferred form of the process of the invention, the plastic foam article is produced with a hard, high density, solid shell about a lower density, cellular, foam plastic core. The product is characterized by high dimensional stability.

The technique of the invention for the production of the hard, high density shell about the lower density, foam plastic core involves providing in a mold cavity a melt of a gas-expansible plastic material containing a blowing agent mixed therein. The melt is initially maintained under pressure to hold the blowing agent in a reduced volume form, usually in solution in the melt. While the melt is held under pressure, the mold cavity is cooled to form a hardened shell of the plastic material about a melt core. Thereafter the pressure is reduced on the melt, causing the melt to be expanded by the blowing agent into a foam structure, with the excess foam material forcing its way out of the cavity. Further cooling of the cavity sets up the foam structure, resulting in a product having a high density shell about a foam plastic core.

The excess foam material removed from the mold cavity may be collapsed, returning it to its previous liquid melt state, and used in the next cycle as a portion of the melt injected into the mold cavity.

In a preferred form of the process of the invention, a melt of the gas-expansible plastic material with the blowing agent contained therein is provided in a shooting chamber. The melt is injected under an elevated pressure from the shooting chamber through a passage into a mold cavity. The high density shell may be formed, if desired, as described above. Thereafter the pressure is reduced on the melt within the cavity causing the melt to be expanded by the blowing agent into the desired foam structure. The excess foam material is permitted to expand through the passage into the shooting chamber. The foam material within the shooting chamber is collapsed and returned to its previous liquid melt state, making it available for injection as a portion of the melt provided to the mold cavity in the next cycle. The hot melt supplied at high pressure to the shooting chamber for the succeeding cycle will collapse the excess foam material contained therein.

Various procedures are available for the preparation of the plastic melt. The melt may be prepared from plastic particles or beads within the shooting chamber itself although, preferably, the melt is prepared in a pre-plasticizer and thereafter provided to the shooting cylinder. The pre-plasticizer desirably produces a fresh melt for each succeeding cycle. It is possible to produce a large batch of the plastic melt in a pressurized heated vessel preceding the shooting chamber, the batch being of a size adequate to supply the melt required for a prolonged operation of the mold injection apparatus. However, this latter procedure is not recommended as the pot life of many plastic materials is limited.

Various ones of the many available gas-expansible or foamable thermosetting and thermoplastic resins may be employed in the practice of the invention. The process is also adaptable to producing foamed elastomers, using an appropriate rubber like thermoplastic compound. The liquid melt composition comprises a predominate proportion of heated resin together with a smaller proportion of the blowing or foaming agent. The blowing agent will generally be used in the amount of about 1–10 weight percent, and, more frequently, in the range of 5–10 percent, of the resin.

Suitable resins include the thermoplastic casting materials such as nylon, polystyrene, polypropylene, and various ones of the vinyl family. Polystyrene and polypropylene are particularly desirable materials. Examples of resins and blowing agents that may be employed are set forth in U.S. Patent No. 2,905,972, Aykanian et al. and Patent No. 2,977,638, Barkhuff et al.

Suitable blowing agents for the various resins are well known. The selection of the blowing agent employed will be governed largely by the particular resin in which it is to be incorporated, the size of the cavity, the desired density of foam, the desired cycle time, etc. The more frequently used blowing agents are nonreactive organic liquids which volatilize below the softening point of the resin. Blowing agents which are liquids at and above ambient room temperatures, e.g. 70–100° F., are particularly suitable where the foam article being mold injected is formed with a hardened shell, although blowing agents which are solid or gaseous at room temperature may be used in some applications. The important characteristic of the blowing agent is that it have a reduced volume under the pressure to which the plastic melt is initially subjected and that with the release of pressure on the resin melt, it expands greatly to provide the large gas volume required for the foaming action. Low boiling alcohols, e.g. methanol and propanol, and low boiling ethers, such as dimethyl ethers, are suitable blowing agents for some plastic resins. Low boiling esters, e.g. ethyl acetate, are also available.

Blowing agents that may be employed with polystyrene include pentane, hexane and heptane. The foregoing Aykanian et al. patent lists other foaming agents that may be used with polystyrene.

Different ones of the "Freon" blowing agents may be used with various ones of the gas-expansible resins. The Freon products are organic compounds containing one to four carbon atoms and fluorine. In some of the compounds, chlorine, bromine and hydrogen atoms are also present. The Freon blowing agents, where compatible with the resin used, are particularly desirable agents because they are not flammable or explosive in the presence of air. The Freon materials are generally characterized in having a low level of toxicity, excellent thermal and chemical stabilities, and high-densities coupled with low boiling points. The Freon type compounds are available in a wide boiling range. For some applications, "Freon 112," $CCl_2F$—$CCl_2F$, which is a solid at room temperature, may be employed.

In applications where desired short cycles combined with restricted nozzle and gate requirements demand high pressure foaming action, "permanent" gases such as nitrogen, methane or carbon dioxide may be used as foaming agents.

Other objects and advantages of the invention will become more apparent from the following detailed description of the invention when read in conjunction with the attached drawing in which:

FIG. 1 is a schematic representation, principally in section, of an injection molding apparatus especially designed for practice of the process of the invention;

FIG. 2 is a sectional view illustrating still another apparatus that may be employed; and FIG. 3 is a sectional view of a third apparatus, minus the mold, which may be used for practice of the process of the invention.

These schematic figures are drawn to illustrate the features of the invention, and do not purport to show the intricate details of nozzle, gating arrangements, quick acting valves, etc. which are well known in the injection molding art.

Plastic particles or beads of a gas-expansible plastic material, such as polystyrene, are placed in a pressurized vessel 10 of FIG. 1 along with a suitable blowing agent, such as hexane or heptane. The resin and blowing agent are introduced to the pressurized vessel 10 through a removable hatch 12. Heat for the preparation of the plastic melt is provided by a heater 14. The temperature of the melt throughout the process is below that which will damage the resin. Stirring of the melt is accomplished by a propeller 16 mounted on the vertical axis of the vessel. Pressurized inert gas, such as nitrogen, is supplied to the vessel through a line 18. A line 20, connecting into the bottom of the vessel 10, leads to a shooting chamber 22. The shooting chamber 22 and line 20 are maintained at an elevated temperature by heating coils 24 and 26 respectively. A rotary valve 28 is placed in the connecting line 20 immediately adjacent the bore of the shooting chamber 22.

The shooting chamber 22 differs somewhat from the conventional mold injection shooting chamber in being considerably longer for a purpose hereinafter described. A piston 30 is movable lengthwise of the chamber 22.

The shooting chamber 22 connects through a line 32 to a water-cooled mold 34. The mold is of conventional structure and comprises two pieces, 38 and 40, with the mold piece 38, through which the plastic is introduced, being stationary. The other mold piece 40 is movable into and out of engagement with the stationary half. Both pieces are held firmly closed by conventional pressure means not illustrated and are released when cooling of the mold has proceeded to a stage sufficient for hardening. Ejection of the article by conventional knock-out bars or pins then takes place. The mold 34 is cooled by internal water lines 42.

The connecting line 32, between the shooting chamber and the mold 34, contains a rotary valve 44 and is heated by coils 46 wrapped thereabout. It will be noted that the pressurized vessel 10, the shooting chamber 22 and the connecting lines 20 and 32 are all heated.

A liquid solution or melt of the resin and a suitable blowing agent is prepared within the pressurized vessel 10 and maintained under an elevated gas pressure, for example, 500–2,500 p.s.i. The foaming agent, as described before, is a substance which enters into solution under the conditions of the pressurized vessel 10 and which, upon release of pressure, boils or comes out of the solution to produce the plastic foam.

Valve 44 is closed and valve 28 is open to admit the melt under pressure to the shooting chamber 22. At this time the piston 30 occupies position A illustrated in full lines. After closing of valve 28, the valve 44 in the connecting line 32 is opened and melt is introduced into the cavity 48 of the mold 34 by movement of the piston 30 to occupy position B illustrated in phantom lines at the left of shooting chamber 22. The piston 30 is desirably left in position B, exerting very high pressure, e.g., 5,000–20,000 p.s.i., on the melt in the cavity, for a brief interval to permit the plastic solution, nearest the cavity wall, to harden and form a shell. The piston 30 is then retracted to position C, illustrated in phantom lines at the right of the shooting chamber 22. Movement of the piston 30 to position C drastically reduces the pressure, e.g. to around atmospheric, and permits the blowing agent to expand and to foam the plastic melt within the hardened shell. The plastic foam in excess of the cavity volume returns to the heated shooting chamber 22 via the heated line 32. Valve 44 is then closed and the piston 30 returned to position A in order to meter a new charge of plastic melt from the supply. Valve 28 is then opened and more melt is introduced under the high pressure of the vessel 10 to the shooting chamber 22, causing the foam therein to collapse and to become a portion of the liquid melt. The cycle may then be repeated after ejection of the molded article from the mold 34.

If it is desired to produce an article without a hardened shell, the pressure is reduced on the melt immediately after the melt has been injected into the mold 34. The time required to form a hardened shell depends on the resin used, the characteristics of the mold, including temperature, and the desired shell thickness.

The pressures used in various parts of the cycle are determined, among other things, by the nature of the blowing agent, the cycle time requirements, the available machinery, etc. Normally a pressure of 500–1,000 p.s.i. is sufficient to keep the melt collapsed in the feeding arrangement. This and efficient feeding are the main requirements to be met during melt storage and shooting chamber refill. In the shooting process, the higher pressures 10,000–30,000 p.s.i. conventionally employed in injection molding are used to insure rapid cavity filling and proper shell formation. During foaming, pressures must be brought to near atmospheric, or the molded article may explode when removed from the mold.

The apparatus of FIG. 2 employs a conventional pre-plasticizer 50 which includes a tilted pre-plasticizer chamber 52, a heated torpedo member 54 supported axially of the chamber at one end, and heating coils 56 wrapped about the exterior of the chamber. A piston 58 is movable lengthwise of the chamber 52. A pressurized hopper 60 containing plastic particles mixed or wetted with a blowing agent opens into the upper end of the tilted chamber 52.

The lower end of the pre-plasticizer chamber 52 connects through a line 62 and valve 69 to one end of a shooting chamber 64. The line 62 and shooting chamber 64 are maintained at elevated temperatures by heating coils 66 and 68, respectively.

One end of the shooting chamber 64 is connected through a passage 70 to a two-piece mold 74. The mold is cooled by internal water tubes 76. The valving for passage 70 is provided by a plunger type valve 78 which is movable into and out of passage 70 through an arm 80. The passage 70 and arms 80 are held at an elevated temperature by heating coils 82. The heated passage 70 is insulated from the mold 74 by an irregularly shaped piece of insulation 84.

The shooting chamber 64 of the device of FIG. 2 is provided with cooling coils 86 at its outer end, i.e. its end removed from the mold and pre-plasticizer inlet. The coils 86 maintain the outer end of the shooting chamber at a somewhat lower temperature than the inner end. For certain combinations of resin and blowing agent, the cooling arrangement assists in the foaming process by keeping the pressure low within the shooting chamber. The cooled surface tends to condense the blowing agent, thus maintaining the pressure differential between cavity and shooting chamber for longer than normal. Any foam which may harden within the shooting chamber is, of course, collapsed and remelted before the next cycle upon introduction of the pressurized melt. The piston 88 of the shooting chamber 64 of FIG. 2 occupies three positions comparable to positions A, B and C of the apparatus of FIG. 1, and, as in the other device, the plastic foam returning to the shooting chamber is fully collapsed by the hot melt entering that chamber. The plunger valve 78 serves in the same role as the valve 44 of the apparatus of FIG. 1 but additionally serves to eliminate gating protuberances on the finished article.

The pre-plasticizer of FIG. 2 in a modified embodiment is provided with a worm feed which replaces the piston 78 and the torpedo 54.

In the operation of the mold injection apparatus of FIG. 2, the piston 58 is moved to the outer end of the pre-plasticizer chamber 52 to permit the entrance of cold plastic particles mixed or wetted with a suitable blowing agent into the latter chamber. The piston is moved to close off the port connecting the hopper 60 and the cylinder 52. At this point of time in the cycle, plunger valve 78 is in passage 70 closing off the mold 74. The piston 88 of the shooting chamber 64 is placed in its intermediate A position. Valve 69 of line 62 is opened. The plastic particles are forced along the heated wall of the pre-plasticizer cylinder 52 and through the annulus between that wall and the heated torpedo 54. The resulting melt enters the shooting chamber 64 through the line 62. Valve 69 is then closed and valve 78 is moved into its open position as illustrated in FIG. 2. Movement of the piston 88 into its position B ejects the plastic melt into the mold 74. The piston 88 is left in position B for a brief interval exerting high pressure which permits the plastic solution nearest the cavity wall to harden and form a shell. The piston 88 is then retracted to position C, thus lowering the pressure to around atmospheric and permitting the foaming agent to expand and foam the plastic within the hardened shell. As in the device of FIG. 1, the excess plastic foam returns to the heated shooting chamber 64. The plunger valve 78 is moved into its closed position and the piston 88 is returned to its intermediate position A. Valve 69 is then opened and more plastic solution or melt is supplied to the shooting chamber, causing the plastic foam therein to collapse.

Position A of the pistons in the shooting chambers of FIGS. 1 and 2 is chosen such that the volume of melt thus contained is just sufficient to fill the cavity when the piston moves to position B. At position B, the volume of plastic contained in the shooting cylinder is minimal, almost all the plastic then being contained in the cavity and intermediate line. At position C, the cylinder volume is much larger than cavity volume, the relation between the two controlling the foam density.

The device of FIG. 3 differs principally from that of FIGS. 1 and 2 in that the melt is prepared from plastic particles within the shooting chamber itself. A shooting chamber 90 is provided with a heated torpedo 92 axially aligned within the chamber adjacent one end thereof. A bin 94 is connected through an injection valve 96 to the shooting chamber 90 centrally of its length. The bin 94 contains cold plastic particles mixed with a suitable blowing agent. Valve 96 is turned to align a transverse passage with the outlet of bin 94. With this movement of the valve, the passage 98 is filled with plastic particles and with further movement of the valve to the position illustrated in FIG. 3 the plastic particles contained in passage 98 are transferred into the shooting chamber 90 by downward movement of a plunger rod 100 or by a charge of compressed gas. The valve 96 may be actuated more than once if the quantity of resin required cannot be supplied by a single actuation of the valve. The shooting chamber 90 is connected through a passage 102 to a mold not illustrated. The passage 102, as in the previously described devices of FIGS. 1 and 2, will be provided with a valve. The shooting chamber is maintained at an elevated temperature by a coil 104.

In the operation of the device of FIG. 3, after the shooting chamber 90 has been charged with plastic particles, a piston 106 is moved towards the heated torpedo. The plastic particles forced through the annulus defined by the inner wall of the shooting chamber 90 and the torpedo 92 melt. The resulting melt is forced in a liquid state through the open passage 102 into the mold. Subsequently the pressure on the melt within the mold is relieved by movement of the piston 106 to the position illustrated in FIG. 3, bringing about the desired foaming. The plastic particles are then charged into the shooting chamber 90 under the force of the plunger rod 100. Subsequent movement of the piston 106 towards the torpedo 92 will result in collapsing of the foam and the melting of the charged plastic particles.

Although exemplary embodiments of the invention have been disclosed herein for purposes of illustration, it will be understood that various changes, modifications, and substitutions may be incorporated in such embodiments without departing from the spirit of the invention as defined by the claims which follows.

I claim:
1. In a method for the manufacture of an article having a foam structure, the steps comprising:
   providing within a fixed volume mold cavity a melt of a gas-expansible plastic material containing a blowing agent mix therein, said melt filling the cavity and maintained under pressure to hold the blowing agent in a reduced volume form;
   cooling the cavity while maintaining the melt under an elevated pressure within said cavity to form a hardened shell of plastic material about the melt; and
   thereafter reducing the pressure on the melt while maintaining the volume of the cavity constant by providing an egress for melt from the mold cavity and causing the melt to be expanded by the blowing agent into a foam structure with the excess foam material being removed from the cavity through said egress.

2. In a method for the manufacture of an article having a foam structure, the steps comprising:
   providing a melt of a gas-expansible thermoplastic material containing a blowing agent mix therein, said melt being maintained under pressure to hold the blowing agent in a reduced volume form;
   injecting the melt through a passage into a fixed volume mold cavity and filling said cavity with the melt;
   subsequent to the injection, reducing the pressure on the melt within the cavity by providing egress through said passage while maintaining the volume of the cavity constant and causing the melt to be expanded by the blowing agent into a foam structure with the excess foam material being removed from said cavity through said passage; and
   cooling the resulting foam structure within the cavity to harden said structure.

3. In a method for the manufacture of an article having a foam structure, said steps comprising:
   providing a melt of a gas-expansible plastic material containing a blowing agent mixed therein, said melt being maintained under pressure to hold the blowing agent in a reduced volume form;
   injecting the melt through a passage into a fixed volume mold cavity and filling said cavity with the melt;
   maintaining the liquid melt under pressure within the cavity and cooling the cavity to form a hardened shell of plastic material about the melt; and
   thereafter reducing the pressure on the melt by providing egress through said passage while maintaining the volume of the cavity constant and causing the melt to be expanded by the blowing agent into a foam structure with the excess foam material being removed in the passage from the cavity.

4. In a method for the manufacture of an article having a foam structure, the steps comprising:
   (a) providing in a shooting chamber having a movable piston a melt of a gas-expansible plastic material having a blowing agent mixed therein, said melt being mainatined within the shooting chamber at an elevated pressure to hold the blowing agent in a nongaseous form;
   (b) injecting the melt through forward movement of the piston, under an elevated pressure from the shooting chamber through a passage into a cooled fixed volume mold cavity and filling said cavity with the melt;

(c) subsequent to the injection, reducing the pressure on the melt within the cavity by withdrawing the piston from its forward position and causing the melt to be expanded by the blowing agent into a foam structure while maintaining the volume of the cavity constant;

(d) permitting excess foam material to expand through the passage into the shooting chamber; and (e) providing a further quantity of the melt in the shooting chamber as in step (a) and in so doing returning the foam material therein to a liquid state.

5. In a method for the manufacture of a mold injected article having a foam structure, the steps comprising:

introducing to a shooting chamber having a movable piston located in a first position a melt of a gas-expansible plastic material having a blowing agent mixed therein, said melt being maintained within the shooting chamber at an elevated pressure to hold the blowing agent in a nongaseous form;

injecting the liquid melt under an elevated pressure from the shooting chamber through a passage into a cooled fixed volume mold cavity and filling said cavity with the melt;

subsequent to the injection, reducing the pressure on the melt within the cavity by providing egress through said passage while maintaining the volume of the cavity constant and causing the melt to be expanded by the blowing agent into a foam structure;

permitting excess foam material to expand through the passage into the shooting chamber, said movable piston being located in a second position which imparts a larger volume to the shooting chamber than with the location of the piston in its first position;

reducing the volume of the foam material in the shooting chamber through movement of the piston to its first position; and introducing more plastic melt with blowing agent mixed therein into the shooting chamber at an elevated pressure and bringing about a return of the foam material therein to a liquid state to become a part of said melt.

6. A method in accordance with claim 5 wherein the excess foam material returning to the shooting chamber is thereby cooled before introduction of the plastic melt.

7. In a method for the manufacture of a mold injected article having a foam structure, the steps comprising:

(a) providing in a shooting chamber having a movable piston a melt of gas-expansible plastic material having a blowing agent mixed therein, said melt being maintained within the shooting chamber at an elevated pressure to hold the blowing agent in a reduced volume form;

(b) injecting the melt through a passage into a cooled fixed volume mold cavity and filling said cavity with the melt;

(c) maintaining the melt under an elevated pressure and for a sufficient length of time within the cooled mold cavity to form a hardened shell of the plastic material adjoining the wall of said cavity;

(d) reducing the pressure on the melt within the cavity by providing egress through said passage while maintaining the volume of said cavity constant and causing said melt to be expanded by the blowing agent into a foam structure;

(e) permitting excess foam material to expand through the passage into the shooting chamber, said shooting chamber having been enlarged by movement of the piston to an extended position and subsequently reducing the volume of the foam material in the shooting chamber through movement of the piston away from its extended position;

(f) providing additional liquid melt with the gas-expansible plastic material therein, to the shooting chamber and thereby returning the foam material within said chamber to a liquid state to become a part of said melt, said liquid melt being provided in the shooting chamber in an amount needed to permit filling of the mold cavity;

(g) removing the foam structure object from the cavity; and (h) repeating steps (b) through (e).

8. A method in accordance with claim 7 wherein at least part of the shooting chamber is cooled to bring about a reduction in pressure during the expansion of the foam.

9. In a method for the manufacture of a mold injected article having a foam structure, the steps comprising:

introducing to a shooting chamber a liquid melt of a gas-expansible plastic material containing a blowing agent mixed therein, said melt being maintained at an elevated pressure to hold the blowing agent in a reduced volume form;

expelling the melt from the shooting chamber and introducing it through a passage into a fixed volume mold cavity and filling said cavity with the melt;

cooling the cavity and maintaining the melt under an elevated pressure within said cavity to form a hardened shell about the melt adjoining the wall of said cavity;

thereafter reducing the pressure on the melt within the cavity by providing egress through said passage and causing the melt to be expanded by the blowing agent into a foam structure while maintaining the volume of said cavity constant;

removing the resulting excess foam material from the cavity through the passage into the shooting chamber; and returning the excess foam material to a liquid state by introduction of a further quantity of the liquid melt of the gas-expansible plastic material to the shooting chamber.

10. A method in accordance with claim 9 wherein the blowing agent employed is a liquid at ambient room temperatures.

11. A method in accordance with claim 9 whereby the blowing agent employed is a solid at ambient room temperatures.

12. A method in accordance with claim 9 wherein the blowing agent employed is gaseous at ambient room temperatures.

13. In a method for the manufacture of an article having a foam structure, the steps comprising:

introducing to a shooting chamber a melt of a gas-expansible thermoplastic material containing a blowing agent mixed therein, said melt being maintained under pressure to hold the blowing agent in a reduced volume form;

injecting the melt from the shooting chamber through a passage into a fixed volume mold cavity and filling said cavity with the melt;

thereafter reducing the pressure on the melt within the cavity by providing egress through said passage while maintaining the volume of the cavity constant and causing the melt to be expanded by the blowing agent into a foam structure;

removing the resulting excess foam material from the cavity through the passage into the shooting chamber;

cooling the foam structure within the cavity to harden said structure; and returning the excess foam material to a liquid state by introduction of a further quantity of the liquid melt of the gas expansible material to the shooting chamber.

14. In a method for the manufacture of a mold injected article having a foam structure, the steps comprising:

providing within a shooting chamber having a movable piston located in a first position a melt of a gas-expansible thermoplastic material having a blowing agent mixed therein, said melt being maintained within the shooting chamber at an elevated pressure to hold the blowing agent in a reduced volume form;

injecting the liquid melt under an elevated pressure from the shooting chamber through a passage into a cooled fixed volume mold cavity and filling said cavity with the melt;

subsequent to the injection, reducing the pressure on the melt within the cavity by providing egress through said passage while maintaining the volume of said cavity constant and causing the melt to be expanded by the blowing agent into a foamed structure;

permitting excess foam material to expand through the passage into the shooting chamber, said movable piston being located in a second position which imparts a larger volume to the shooting chamber than with location of the piston in its first position;

reducing the volume of the foam material in said shooting chamber by reducing the volume of the shooting chamber through movement of said piston; and providing more plastic melt with the blowing agent mixed therein within the shooting chamber at an elevated pressure and bringing about a return of the foam material therein to a liquid state to become a part of said melt.

15. A method in accordance with claim 14 wherein in reduction of the volume of the excess foam material, the piston is moved to its first position.

References Cited by the Examiner

UNITED STATES PATENTS

| | | | |
|---|---|---|---|
| 2,671,246 | 3/1954 | Lester | 18—30 |
| 2,831,214 | 4/1958 | Eyles et al. | 18—30 |
| 3,029,472 | 4/1962 | Fischer | 18—48 XR |
| 3,058,161 | 10/1962 | Beyer et al. | 18—48 |
| 3,144,493 | 8/1964 | Santelli | 264—51 |
| 3,145,240 | 8/1964 | Proulx et al. | 264—53 |
| 3,162,703 | 12/1964 | Eyles | 264—51 |

OTHER REFERENCES

Modern Plastics, "New Technique for Processing Expandable Styrene Foam: Injection Molding," September 1960, pages 113, 115 and 202.

Plastics World, "Injection Molding Expandable Polystyrene Beads," January 1962, pages 18ff.

ALEXANDER H. BRODMERKEL, *Primary Examiner.*